United States Patent
Pizzi

(10) Patent No.: US 6,879,084 B2
(45) Date of Patent: Apr. 12, 2005

(54) ELECTROSTATIC ACTUATOR, FOR CAUSING A TRANSVERSE MOVEMENT OF A YARN IN A TEXTILE MACHINE, AND A TEXTILE MACHINE INCLUDING THIS ACTUATOR

(75) Inventor: Marco Pizzi, Turin (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 46 days.

(21) Appl. No.: 10/442,948

(22) Filed: May 22, 2003

(65) Prior Publication Data

US 2004/0007939 A1 Jan. 15, 2004

(30) Foreign Application Priority Data

Jul. 9, 2002 (IT) .......................... TO2002A0593

(51) Int. Cl.$^7$ .......................... H02N 1/00; G03C 13/00
(52) U.S. Cl. ................. 310/309; 139/256 R; 66/125 R; 242/481.2
(58) Field of Search ....................... 310/309; 139/256 R, 139/269, 273 R, 274; 66/125 R; 242/481.2, 476.6, 157.1

(56) References Cited

U.S. PATENT DOCUMENTS

| | | | | |
|---|---|---|---|---|
| 3,867,966 A | | 2/1975 | Wieland | 139/55 |
| 4,248,501 A | * | 2/1981 | Simpson | 359/227 |
| 4,266,339 A | * | 5/1981 | Kalt | 29/829 |
| 4,442,869 A | | 4/1984 | Speich et al. | 139/71 |
| 4,503,891 A | * | 3/1985 | Novak et al. | 139/116.2 |

FOREIGN PATENT DOCUMENTS

| | | | | |
|---|---|---|---|---|
| DE | 2426021 A1 | | 12/1975 | H02N 11/00 |
| EP | 0837551 A2 | | 4/1998 | H02N 11/00 |
| EP | 1381145 | * | 1/2004 | H02N 1/00 |
| FR | 2134061 A | | 12/1972 | H02N 1/00 |
| GB | 291534 A | | 7/1928 | D03C/13/00 |
| WO | WO 02/49199 A1 | | 6/2002 | H02N 1/00 |

OTHER PUBLICATIONS

European Search Report dated Oct. 24, 2003.

* cited by examiner

*Primary Examiner*—Karl Tamai
(74) *Attorney, Agent, or Firm*—Sughrue Mion, PLLC

(57) ABSTRACT

An electrostatic actuator is described, which can be used for moving a yarn fed continuously in a textile machine in a direction orthogonal to the longitudinal direction of the yarn, between two end positions.

2 Claims, 3 Drawing Sheets

US 6,879,084 B2

ELECTROSTATIC ACTUATOR, FOR CAUSING A TRANSVERSE MOVEMENT OF A YARN IN A TEXTILE MACHINE, AND A TEXTILE MACHINE INCLUDING THIS ACTUATOR

BACKGROUND OF THE INVENTION

The present invention relates to the field of electrostatic actuators. Actuators of this type have already been studied and produced by the applicant, as well as proposed, for example, in European Patent Application EP-A-837551.

Typically, the above actuators comprise a substrate made, for example, of a plate of plastic material of a few millimetres in thickness, upon which a microlayer of electrically conductive material, designed to constitute a first electrode of the device, is applied, using any suitable technology, such as for instance spin-coating, dipping or the like. The above electrode is then coated with an insulating layer made of dielectric material, designed to insulate the first electrode from a second electrode in the form of a lamina or "petal", which has one end secured to the dielectric layer of the substrate and the opposite end free to move between a rest condition, for example a curled condition, and an active condition, where it is distended over the dielectric layer of the substrate. The dielectric layer and the electrodes typically have a thickness of a few microns. The passage of the movable electrode from its rest condition to the distended condition is obtained by applying a voltage between the two electrodes, so as to cause adhesion, by electrostatic effect, of the second electrode over the surface of the substrate. When the applied voltage goes to zero, the second electrode returns due to its own elasticity to the curled rest condition.

SUMMARY OF THE INVENTION

The purpose of the present invention is, on the one hand, that of proposing new and advantageous embodiments of an electrostatic actuator of the type referred to above and on the other hand, that of identifying new and advantageous applications of an actuator of this type.

In order to achieve the above and further purposes, the subject of the invention is an electrostatic actuator, characterized in that it comprises:

- a substrate;
- a movable member in the form of a roller, which is designed to roll over the substrate between two end positions;
- at least one fixed electrode in the form of a thin film, applied on the top surface of the substrate on which the roller rolls;
- at least one first electrostatic petal and one second electrostatic petal consisting of electrically conductive thin films in the form of strips, which extend over the substrate in the direction of rolling of the roller, on opposite sides thereof, each with one end, anchored to the substrate and the opposite end anchored to the roller;
- at least one dielectric layer, which separates the electrode fixed to the substrate from the petals; and
- means for applying a voltage between the fixed electrode and, selectively, the first petal and the second petal, so as to control movement of the roller towards its first end position or towards its second end position.

The aforesaid means of application of the voltage are designed for alternately supplying, in succession, the first and the second petal so as to cause a continuous reciprocating movement of the roller between its two end positions.

The actuator according to the invention can be advantageously used in a textile machine equipped with means for continuously feeding a yarn longitudinally and in which it is necessary to cause a transverse oscillation of the yarn between two end positions. For this purpose, there may advantageously be used an actuator according to the invention, in which the roller moved by the actuator may constitute a tubular element for guiding the yarn in such a way as to cause a reciprocating displacement of the yarn between two end positions in a direction orthogonal to the longitudinal direction of the yarn.

A subject of the present invention is also a textile machine of any type, equipped with means for feeding a yarn continuously along its longitudinal direction, and means for alternately displacing the yarn between two end positions in a direction orthogonal to its longitudinal direction, said textile machine being characterized in that the aforesaid means for transverse displacement of the yarn are constituted by an electrostatic actuator. Preferably, the electrostatic actuator of the machine according to the invention is of the type that has been described above, but any alternative configuration of electrostatic actuator is possible given that the simple idea of applying an electrostatic actuator of any kind to a textile machine for obtaining the result described is in itself new and inventive.

BRIEF DESCRIPTION OF THE DRAWINGS

Further characteristics and advantages of the invention will become clearly apparent from the following description with reference to the annexed drawings, which are provided purely by way of non-limiting example and in which.

DETAILED DESCRIPTION OF THE INVENTION

Figure 1:
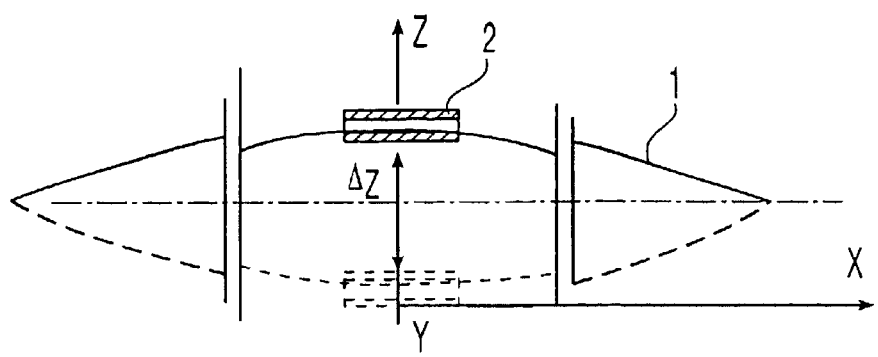
FIG. 1 is a schematic side view of a device for transverse movement of the yarn fed into a textile machine.
Figure 5:
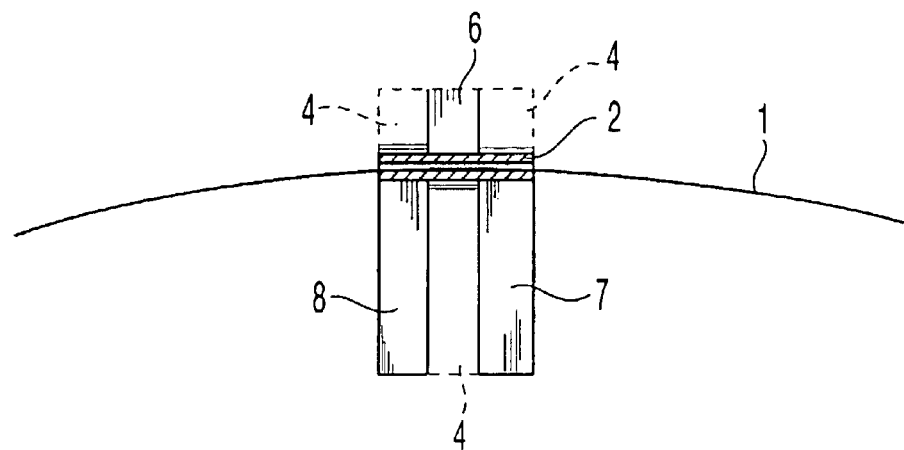
FIG. 5 is a schematic plan view of the actuator of FIG. 2.

FIG. 1 is a schematic illustration of a device for lateral movement of a yarn 1, which is fed continuously in the direction X through means (not illustrated) of any known type. According to the invention, the yarn 1 traverses a tubular guide element 2, which is reciprocated in a direction Z orthogonal to the direction X between two end positions. An application of this sort may, for example, be useful in a textile loom, for the purpose of moving the yarn of the weft with respect to the threads of the warp. In an application of this type, the displacement required for the tubular element 2 between its two end positions is in the region of a few centimetres, for example 5–10 cm, and must be effected with a frequency in the region of a few Hertz, for example 10 Hz. It is, moreover, necessary to achieve the maximum possible compactness of the actuator for transverse movement of the yarn 1 in the direction Y orthogonal to the plane XZ.

Figure 6:
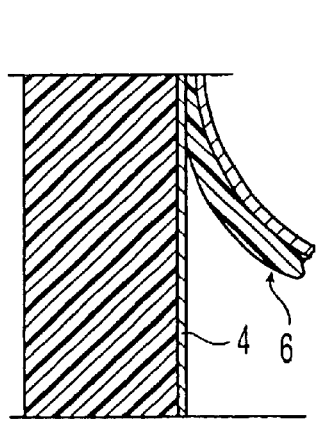
FIGS. 6 and 7 illustrate, at an enlarged scale, a particular of the actuator of the invention according to two possible variants.
Figure 7:
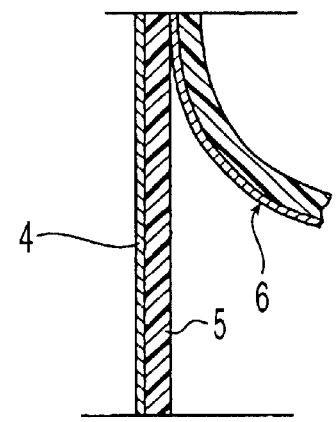
Figure 2:
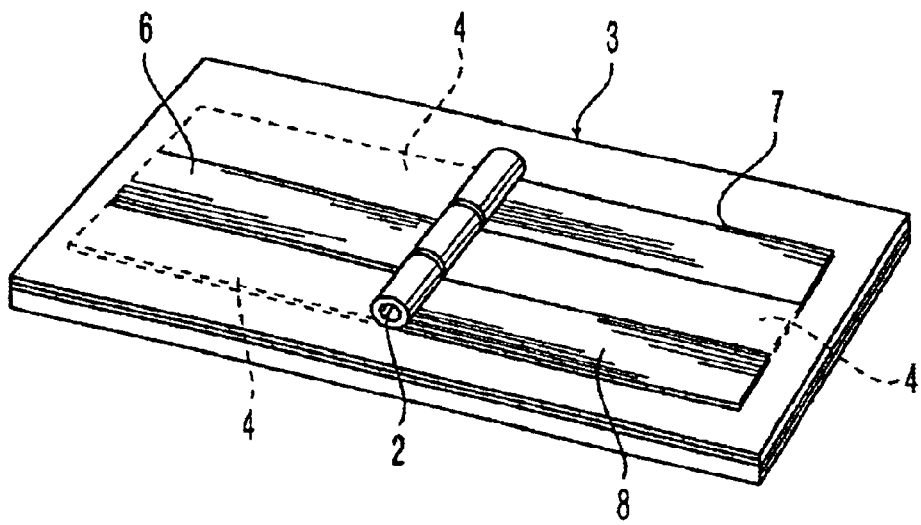
FIG. 2 is a schematic perspective view of a preferred embodiment of the actuator according to the invention.
Figure 3:
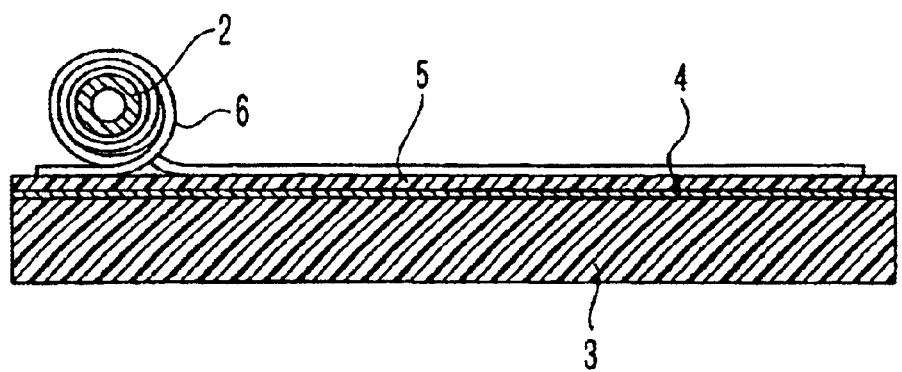
FIGS. 3 and 4 are side elevations of the actuator illustrated in FIG. 2 in two different operating conditions.
Figure 4:
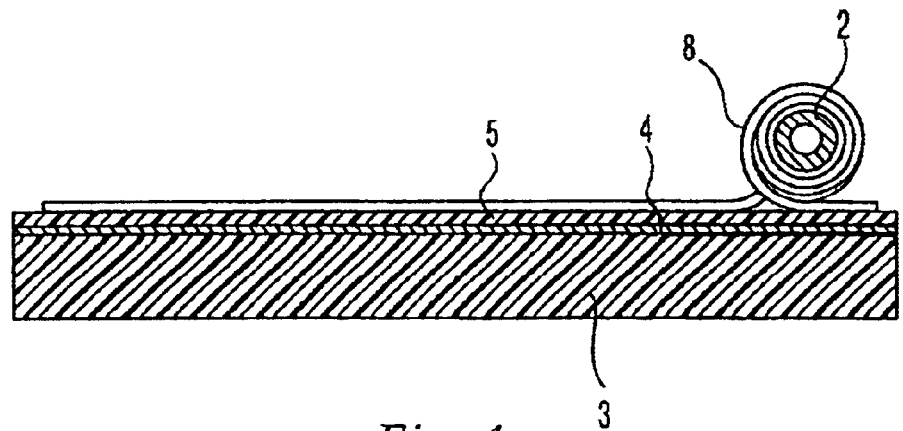

According to the invention (see FIGS. 2, 3, 4 and 5), the tubular element 2 is provided for rolling on the surface of a substrate 3 consisting, for example, of a plate of plastic material of a few millimetres in thickness, on which there is applied by means of any suitable technique (spin-coating, evaporation, dipping, etc.) a microlayer of the thickness of a few microns of an electrically conductive material, constituting a first fixed electrode 4. The surface of the electrode 4 is then covered by a further microlayer 5 of dielectric material, which separates the fixed electrode 4 from three movable electrodes 6, 7, 8, which are applied on top of the substrate 3. Each of the electrodes 6, 7, 8 is made up of a microlayer of electrically conductive material, which is possibly associated to a polymeric layer in the form of a strip elongated longitudinally in the direction of rolling of the tubular element 2. Each movable electrode or petal has one distal end with respect to the tubular element 2, which is firmly anchored to the substrate, and an opposite end, which is anchored to the roller. In the case of the solution illustrated in FIG. 2, by applying a voltage between the fixed electrode 4 and the movable electrode 6, the latter tends to a spread out over the substrate so as to enable the other two movable electrodes 7, 8 to bias the tubular element 2 towards its right end position, as viewed in FIG. 2. Likewise, by applying a voltage only between the electrode 4 and the electrodes 7, 8, a rolling of the electrode 6 is obtained, with consequent displacement of the tubular element 2 towards its left end position (once again with reference to FIG. 2). The two extreme conditions are illustrated in FIGS. 3 and 4. FIGS. 6 and 7 illustrate two alternative solutions, in which the dielectric layer is associated, respectively, to the substrate, as already described, or else to each of the movable petals, the important fact being that, in any case, an insulating layer is prepared which will prevent direct contact between the fixed electrode and the movable electrodes.

Figure 8:
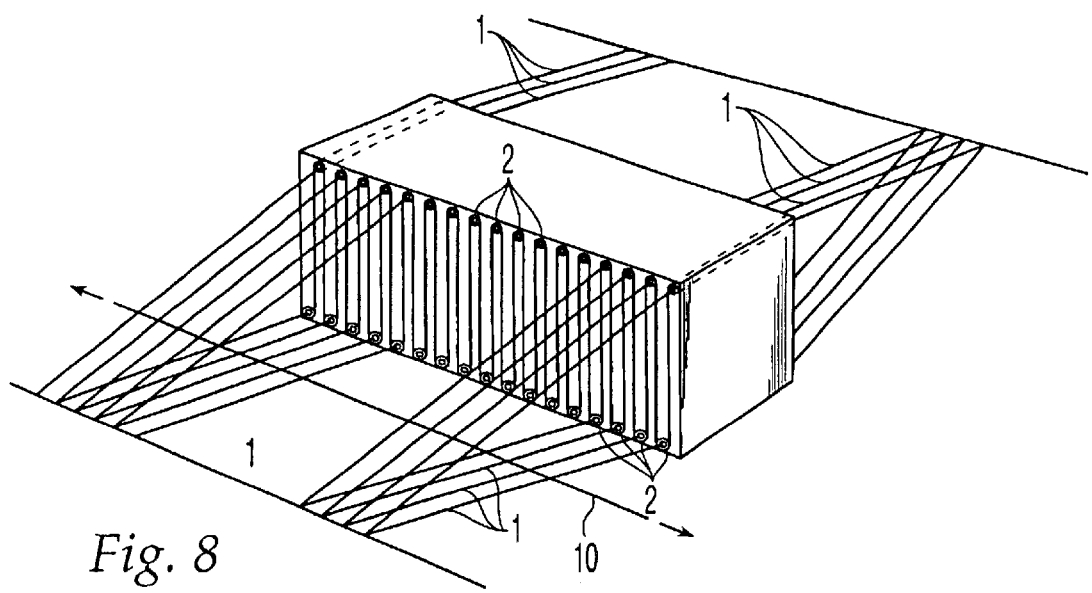
FIG. 8 is a schematic perspective overall view of an actuator made according to the invention.
Figure 9:
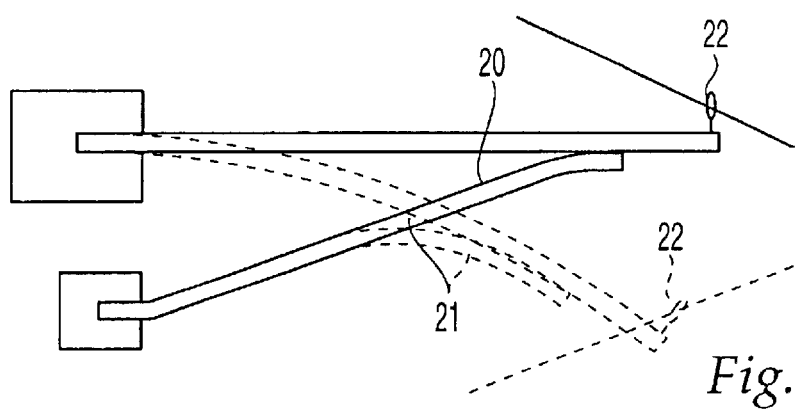
FIG. 9 is a schematic side view of a further embodiment of an electrostatic actuator which can be used in the machine according to the invention.
Figure 10:
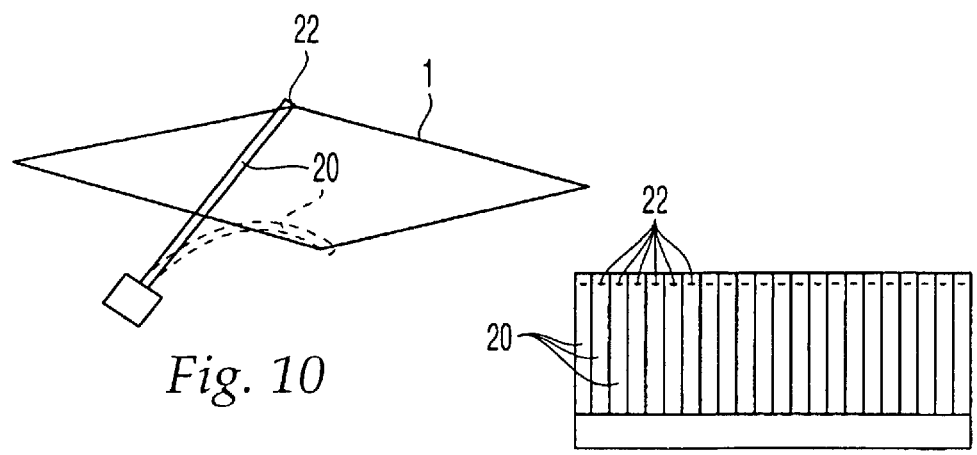
FIG. 10 is a schematic side view illustrating the application of the actuator of FIG. 9.
Figure 11:
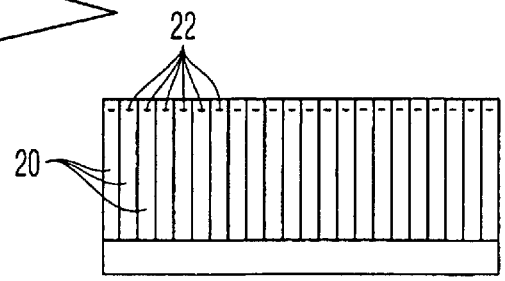
FIG. 11 is a front view of the actuator of FIG. 10.

FIG. 8 illustrates how it is possible to provide a plurality of actuators of the type referred to above in a relatively small space, thanks to the extreme compactness of said actuators in the direction perpendicular to the plane of movement of each thread of yarn. It is thus possible, in a textile loom move reciprocatingly the weft in a direction transverse with respect to their longitudinal direction in order to enable their engagement on the yarn of the warp 10. FIG. 9 illustrates a variant of the electrostatic actuator, which can be used once again in a textile loom of the type referred to above. In this case, the actuator is made up of a flexible lamina 20, constrained on which is an end of a movable petal 21. The electrostatic adhesion of the petal 21 to the lamina 20 causes deflection of the lamina and its consequent displacement from the position illustrated by a solid line in FIG. 9 to the position illustrated by a dashed line. FIG. 10 illustrates an application of said actuator for the movement of the yarn of the weft. Pre-set on the free end of the lamina is an eyelet 22 which is engaged by the yarn. FIG. 11 illustrates how a number of threads may be actuated individually by assembling a plurality of actuators of the type described above, which can be obtained also starting from a single support shaped as illustrated in FIG. 11.

Naturally, without prejudice to the principle of the invention, the details of construction and the embodiments may vary widely with respect to what is described and illustrated herein purely by way of example, without thereby departing from the scope of the present invention.

What is claimed is:

1. An electrostatic-effect actuator, wherein it comprises:

a substrate;

a movable member in the form of a roller, designed to roll over the substrate between two end positions;

at least one fixed electrode in the form of a thin film applied on the top surface of the substrate, on which the roller rolls;

at least one first electrostatic petal and one second electrostatic petal made up of electrically conductive thin films and made in the form of strips, which extend over the substrate in the direction of rolling of the roller, on opposite sides with respect thereto, each with one end anchored to the substrate and the opposite end anchored to the roller;

at least one dielectric layer, which separates the electrode fixed to the substrate from the petals; and means for applying a voltage between the fixed electrode and, selectively, the first and second petals, so as to control displacement of the roller either towards its first end position or towards its second end position.

2. The actuator according to claim 1, wherein in that said roller is traversed by a yarn in a textile machine and is used for translating the yarn in a direction perpendicular to its longitudinal direction.

* * * * *